May 31, 1960 H. I. STANBACK ET AL 2,938,942
ELECTRICAL DISTRIBUTION DUCT
Filed Aug. 16, 1957 3 Sheets-Sheet 1
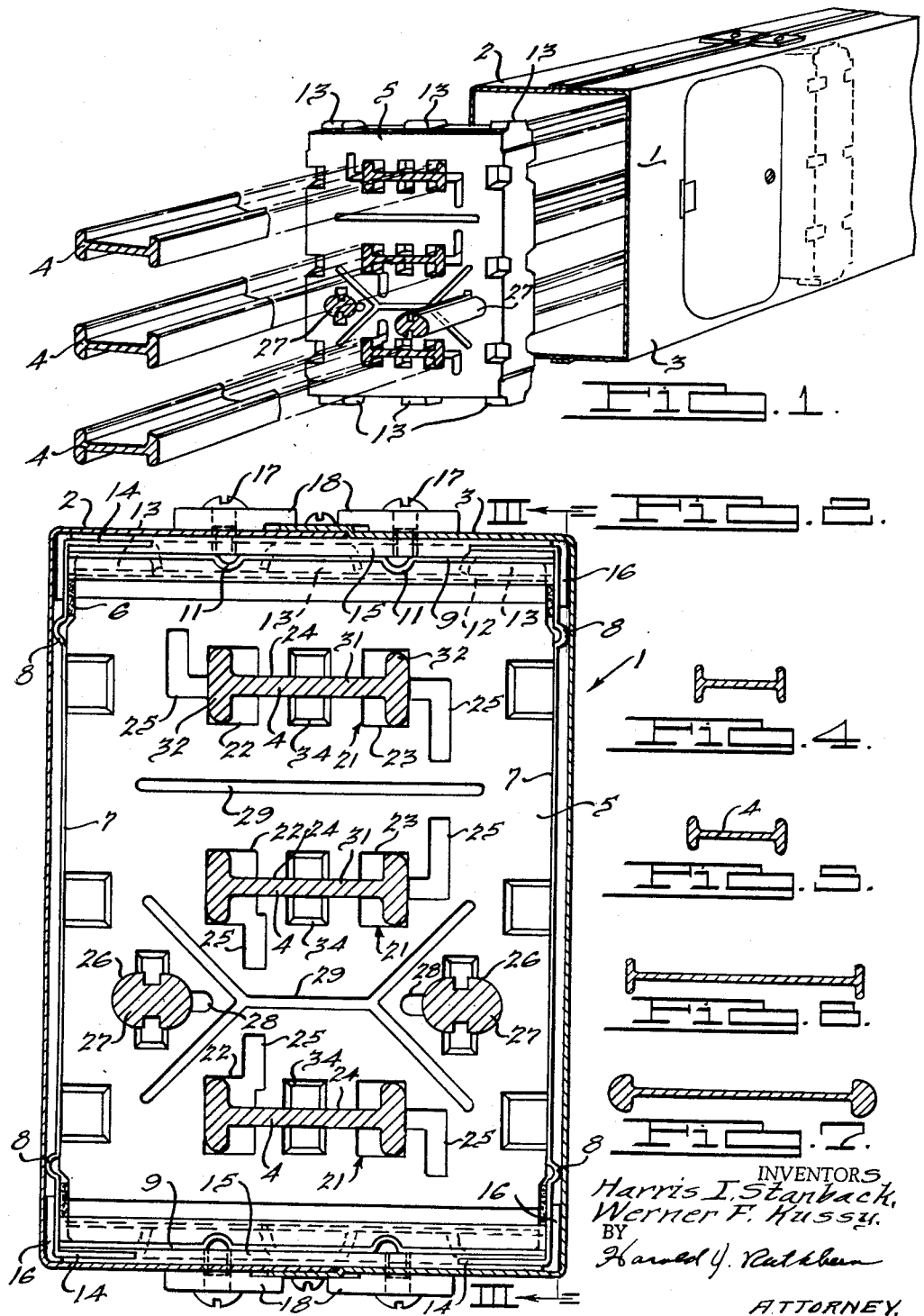
INVENTORS
Harris I. Stanback,
Werner F. Hussy,
BY
Harold J. Rathbun
ATTORNEY.

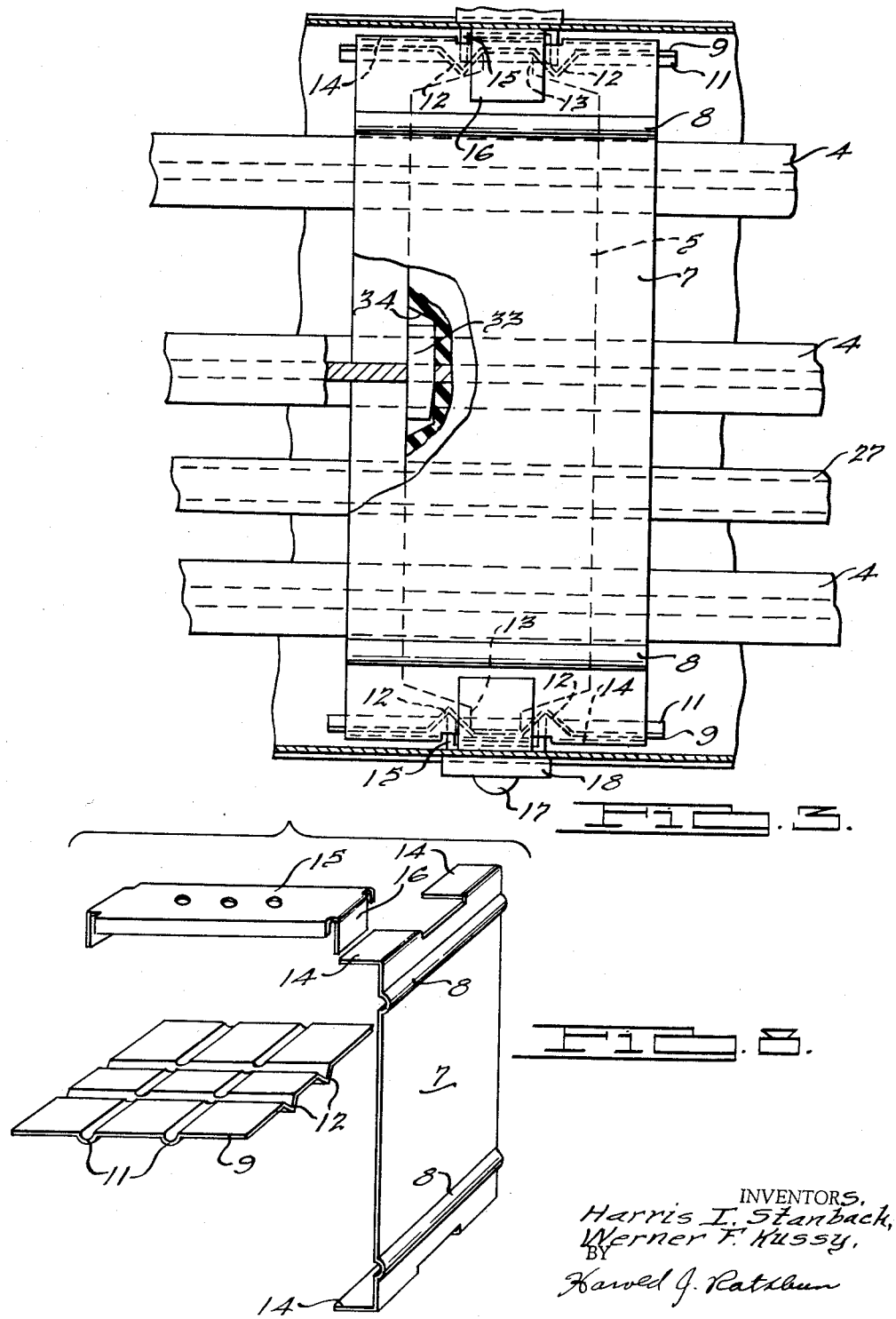

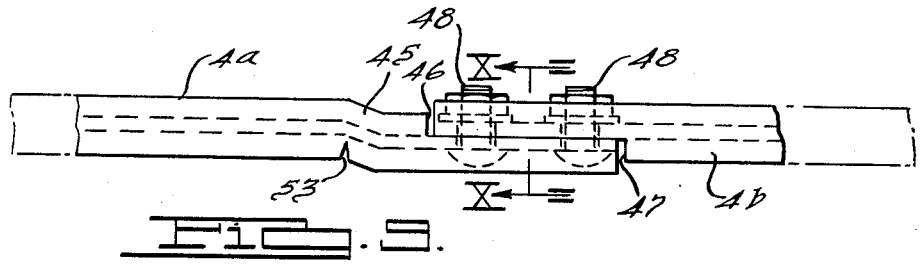
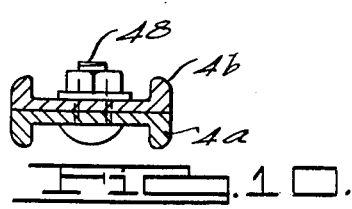
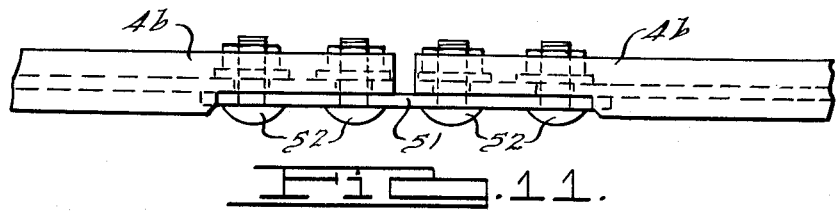
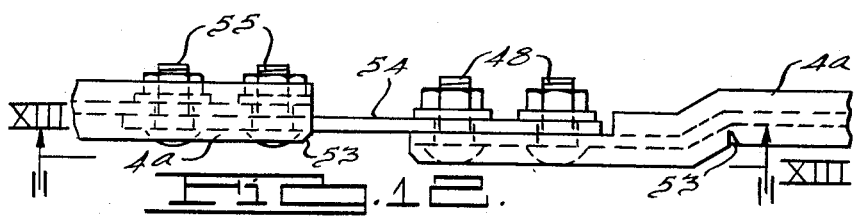
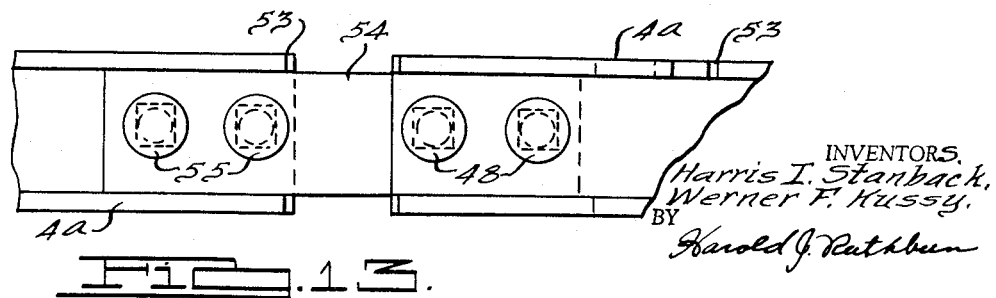

United States Patent Office 2,938,942
Patented May 31, 1960

2,938,942
ELECTRICAL DISTRIBUTION DUCT

Harris I. Stanback and Werner F. Kussy, Birmingham, Mich., assignors to Square D Company, Detroit, Mich., a corporation of Michigan Filed Aug. 16, 1957, Ser. No. 678,642

7 Claims. (Cl. 174—99)

This invention relates to an electrical distribution system generally, and more particularly to an electrical distribution duct of the type having spaced rigid conductors within an enclosure.

Distribution of electrical energy to control centers or to individual electrical loads from the input facilities of a power company, or from the point of generation, is often accomplished by a system of ducts. Such a system is disclosed, for example, in Patent No. 2,444,648, issued to John G. Jackson and Ralph H. Kingdon, dated July 6, 1948.

The present invention is an improvement on the duct disclosed in the patent in that the duct herein described includes bus conductors having greater rigidity and heat dissipating ability. The bus conductors are carried by improved insulating supports that afford positive control of any arcs that may develop within the duct.

Accordingly, an object of the present invention is to provide an improved distribution duct.

A further object is to provide a distribution duct having improved bus conductors with a relatively high moment of inertia to achieve high flexural rigidity.

A further object is to provide a distribution duct having improved bus conductors with large heat dissipating surfaces relative to their cross-sectional areas.

A further object is to provide a distribution duct having improved insulating supports adapted to accept bus conductors of various configurations.

A further object is to provide a distribution duct having insulating supports provided with arc channels.

A further object is to provide a distribution duct having gas producing means to assist in the dissipation of arcs.

A further object is to provide a distribution duct having bus conductors of generally I-shaped cross-section but cooperable with conventional power take-off apparatus heretofore used with cylindrical and rectangular bus conductors.

A further object is to provide a distribution duct having bus conductors of generally I-shaped cross-section each provided with a terminal construction that facilitates connection with adjacent sections of duct.

Other objects and advantages will become apparent from the following description wherein reference is made to the drawings, in which:

Fig. 1 is a perspective view of a distribution duct according to the present invention.

Fig. 2 is a transverse cross-sectional view of the duct of Fig. 1.

Fig. 3 is a cross-sectional view taken along the lines III—III of Fig. 2.

Figs. 4, 5, 6 and 7 are cross-sectional views of bus conductors of different ratings.

Fig. 8 is an exploded perspective view of the gas producing means.

Fig. 9 is a side view showing a connection between bus conductors of adjacent duct sections.

Fig. 10 is a cross-sectional view taken along the lines X—X of Fig. 9.

Fig. 11 is a side view of a modified connection.

Fig. 12 is a side view showing a connection between modified bus conductors.

Fig. 13 is a view taken along the lines XIII—XIII of Fig. 12.

The distribution duct of the present invention comprises an elongated enclosure having a plurality of longitudinally spaced insulators disposed therein. The insulators extend transversely of the enclosure and respectively define successive spaces therein. A plurality of bus conductors extending longitudinally of the enclosure pass through the insulators and are maintained thereby in spaced relationship. Each of the insulators is provided with a plurality of arcing channels extending from the bus conductor openings to permit an arc to travel through the system. An arc-responsive, gas-producing means surrounds each of the insulators so that an arc travelling through the duct system will encounter the gas-producing means before reaching the insulators. The gas thus produced increases the pressure of the gaseous medium within the space containing the arc and the pressure differential between this space and the next adjacent spaces forces the arc into the next adjacent space. Thus any arc formed is caused to travel along the duct system.

Referring to Fig. 1, a section of the distribution duct in accordance with this invention comprises an elongated rectangular enclosure 1 defined by a pair of channel-shaped members 2 and 3. The channel-shaped members 2 and 3 have their flanges inwardly disposed in telescoping relation, the flanges forming the top and bottom of the enclosure, respectively. The terminal portions of the flanges of the member 3 are offset an amount equal to the thickness of the material employed so that when the members 2 and 3 are telescoped a substantially smooth inner surface is presented at the top and bottom of the enclosure 1.

Within the enclosure 1 a plurality of rigid bus conductors 4 of substantially I-configuration are supported in transverse spaced apart relation by a plurality of longitudinally spaced insulating supports 5 of substantially rectangular cross-section.

Referring now to Figs. 2 and 3, pads 6, preferably of felt, are provided at each corner of each of the insulating supports 5 to cushion them from a pair of molded fiber panels 7 disposed between the supports 5 and the opposite side walls of the enclosure 1. Each of the panels 7 has upper and lower longitudinally extending ribs 8. Similarly a pair of molded fiber panels 9 are disposed between the top and bottom, respectively, of each of the supports 5 and the enclosure 1. Each of the fiber panels 9 is provided with a pair of spaced longitudinally extending ribs 11 and a pair of spaced transverse ribs 12.

The top and bottom of the insulating supports 5 are provided with three bosses 13, respectively (Fig. 1) defining recesses therebetween for the accommodation of the ribs 11 of the panels 9. The bosses 13 are received between the transverse ribs 12 of the panels 9.

Each of the fiber members 7 has a pair of spaced folded extensions 14 at the top and bottom thereof that overlie the top and bottom fiber members 9, respectively.

Each insulating support 5 is maintained in position within the enclosure 1 by top and bottom channel-shaped members 15, which are preferably of metal, and have downwardly and upwardly folded flanges 16, respectively, at each end thereof. The member 15 is accommodated between the folded extensions 14 of the fiber members 7, the flange 16 extending over the exterior of the fiber members 7 in locking relationship. Suitable screws 17 extend through the enclosure 1 and engage the members 15 to secure them in position. A plurality of mounting brackets 18 are held in place as by the screws 17 and serve as attachment means for electrical take-off devices (not shown) adapted to cooperate with the present invention.

Each of the insulating supports 5 is provided with three composite openings generally designated 21. Each of the openings 21 comprises a rectangular portion 22 joined to a like rectangular portion 23 by a slot portion 24. The composite openings 21 extend through the insulators 5 and are adapted to accommodate I-section bus conductors 4, respectively, of various ratings as will be discussed. A plurality of arcing channels 25 extend through the insulators 5 and cooperate with the portions 22 and 23 of the openings 21 to reduce the electrical resistance between adjacent bus conductors 4 and between the exterior pair of the three bus conductors 4 and the enclosure 1. A pair of spaced openings 26 extend through the insulator 5 and each accommodates a neutral bus conductor 27 if desired. Arcing channels 28 cooperate with the openings 26, respectively, to provide paths for arc travel along the neutral busses 27. The insulators 5 have a plurality of grooves 29 spaced about the openings 21 and 26 to provide additional creepage surface between the busses 4 and 27.

The improved bus conductors 4 utilized in the duct of the present invention have a cross-section of substantially I-configuration. It is well known that flat bus bars provide a large heat dissipating surface in proportion to their cross-sectional area. However, flat bus bars have a relatively small moment of inertia and are subject to failure due to the flexural stresses produced by an extreme overload or a short circuit. Bus bars or rod or tube construction have an improved moment of inertia but provide less desirable heat dissipating characteristics due to minimum surface area in proportion to cross-sectional area. The present invention combines the desirable heat dissipating characteristics of the flat bus bar with the desirable high strength in proportion to area feature of the rod or tube. The bus bars of I-cross-sectional configuration disclosed herein has a central web portion 31 and terminal flange portions 32. The flange portions 32 preferably are all of the same width irrespective of the rating of the bus, the thickness of the flange being varied for different ratings. One advantage of the constant flange width is the ready acceptance of the spring jaw clips of conventional electrical take-off devices as shown in the aforementioned patent to John G. Jackson et al. A change in rating of the bus is also accomplished by providing a web portion of different transverse length. The portions 22 and 23 of the composite openings 21 are made wide enough to accommodate busses 4 having webs of various transverse lengths and flanges of various thicknesses. The width of the flanges 32 and the thickness of the web 31 can be maintained constant. Examples of busses of different ratings are shown in Figs. 4 through 7 which may represent ratings of 400, 600, 800 and 1000 amperes, respectively.

To insure proper positioning of the bus conductors 4 within the enclosure 1 and to prevent any longitudinal movement thereof relative to the insulating supports 5, a locking pin 33 extends through a complementary hole in the web portion 31 of each of the bus conductors 4 and is accommodated in a complementary recess 34 formed in each of the insulating supports 5.

One of the advantages of the duct of the present invention is its ability to withstand arcing without physical injury. Distribution systems of the prior art often break down due to arc stoppage which occurs when an arc encounters a path of increased resistance such as is found at each insulating support. A stationary arc with its inherent localized heating at the arcing points subjects the bars to fusion and rupture.

In accordance with this invention, continuous arc movement through the duct system is facilitated at each insulating support 5 by the channels 25 which provide paths of relatively low electrical resistance permitting any arc to freely pass therethrough. In addition, a means for pushing the arc through the channels 25 is provided.

There is a tendency for arcs to move through a distribution system with the arc path normal to the bus conductors and the enclosure. As best seen in Fig. 3, the fiber panels 7 and 9 extend longitudinally beyond both face surfaces of their associated one of the insulators 5. Thus an arc will encounter the fiber panels 7 and 9 before reaching an insulator 5. The panels 7 and 9 are made of a fibrous composition that emits a gas when heated by an electrical arc. Such fibrous materials are well known in the art, and preferably one that is hard, dense, and slow-burning is selected, for example, commercial grade fiber as listed in the Book of Standards of the American Society for Testing Materials, section D710–54T. Gas produced by the heated or burning fiber builds up pressure in the space between the insulators 5 in which the arc is disposed. The pressure differential thus created between adjacent spaces literally blows the arc through the arc channels 25 and into the next adjacent space of lower pressure. As the arc is blown through successive insulating supports 5 it is cooled, de-ionized, and eventually dissipated or forced into conventional arc damping facilities. Damage to the duct system is thus minimized by the simple expedient of providing gas-producing fibrous members adjacent the insulators 5 in cooperating relationship with the arc channels 25.

Figs. 9 through 13 illustrate various methods of connecting adjacent sections of the I-beam bus conductors 4 of the present invention which permits improperly mated sections of duct to be easily joined together. Fig. 9 illustrates the normal connection of the terminal ends 4a and 4b of two adjacent bus bars 4 when the bars 4 are properly mated. It should be understood that each bus conductor 4 of each section of duct in the distribution system will have an offset end 4a and a straight end 4b respectively, as shown connected in Fig. 9. End 4a is offset at 45 and has one side of each of its flanges removed as at 46 to accept the terminating end 4b which also has its flanges removed on one side in complementary fashion as at 47. Connection of adjacent sections which have a terminal end 4b mated with a similar terminal end 4b is shown in Fig. 11. The dimensional characteristics of the sections are such that the ends 4b will be spaced lengthwise from each other as indicated. Connection of the ends 4b is easily accomplished by using a jumper strap 51 of conducting material secured as by suitable bolts 52, to each of the bus terminals.

A less desirable condition exists should the two offset ends 4a of the distribution busses be brought into abutting relationship for connection (Fig. 12). The busses 4a if not modified, would overlap with their offset portion in the same plane, thus preventing proper connection. To provide for this situation, the ends 4a of the distribution bus bars 4 are notched as at 53 adjacent the offset portion 45 to indicate the length of bus to be removed. With the offset terminal portion 4a of one bus bar removed, interference of the bus conductors is eliminated and the bussses may be joined by a jumper strap 54 secured as by suitable bolts 48 and 55.

What is claimed is:

1. A distribution duct comprising an enclosure having longitudinally extending walls, a plurality of longitudinally spaced insulators defining a plurality of spaces within said enclosure, a bus conductor disposed within said enclosure and extending into each of said spaces and supported by said insulators in spaced relation to said walls, an arcing channel in each of said insulators of relatively small cross-sectional area with respect to the cross-sectional area of said enclosure thereby to function as an orifice between adjacent areas of said spaces, and an arc responsive gas-producing means in each of said spaces operative to produce a gas in any one of said spaces upon the appearance of an arc within said one space thereby to create a pressure differential between said one space and an adjacent space.

2. A distribution duct comprising an elongated enclosure, a plurality of longitudinally spaced insulators within said enclosure extending transversely thereof and defining a plurality of successive spaces within said enclosure, a plurality of bus conductors within said enclosure supported in spaced relation to each other by, and passing through said insulators, an arcing channel in each of said insulators of relatively small cross-sectional area with respect to the cross-sectional area of said enclosure thereby to function as an orifice between adjacent areas of said spaces, gas-producing means disposed between said insulators in each of said spaces, respectively, and each of said gas-producing means being responsive to an electrical arc within its associated space to produce a gas therein thereby to create a pressure differential between said associated space and an adjacent space.

3. The distribution duct of claim 2 characterized in that each of said gas-producing means is a fiber panel extending between said enclosure and said bus conductors.

4. The distribution duct of claim 2 characterized in that each of said gas-producing means is a fiber panel disposed between an associated one of said insulators and said enclosure and extending longitudinally beyond said support into its associated space.

5. A distribution duct comprising an elongated enclosure, a plurality of longitudinally spaced insulators within said enclosure extending transversely thereof and defining successive spaces lengthwise of said enclosure, an arc responsive gas-producing means in each of said spaces, a plurality of bus conductors within said enclosure supported in spaced relation to each other by, and passing through, each of said insulators, an arcing channel in each of said insulators having a cross-section materially smaller than the cross-section of said insulators, thereby to define an orifice between said spaces whereby upon the occurrence of an arc in one of said spaces a pressure differential is developed between said one space and an adjacent space to facilitate arc movement from said one space into an adjacent space.

6. A distribution duct comprising an elongated enclosure, a plurality of longitudinally spaced insulators within said enclosure extending transversely thereof and defining successive spaces lengthwise of said enclosure, an arc responsive gas-producing means between each of said insulators, respectively, and said enclosure and extending into said spaces, respectively, a plurality of bus conductors within said enclosure supported in spaced relation to each other by, and passing through, said insulators, and each of said insulators having an arcing channel of a cross-section materially smaller in area than the cross-sectional area of said insulators thereby to define an orifice between said spaces whereby upon the occurrence of an arc in one of said spaces a pressure differential is developed between said one space and an adjacent space to facilitate movement of the arc from said one space, through said orifice and into said adjacent space.

7. A distribution duct comprising a bus conductor, a tube-like enclosure having longitudinally extending wall portions completely surrounding said conductor on all four sides, a plurality of insulators disposed transversely of said enclosure and spaced longitudinally thereof to define a plurality of spaces within said enclosure, openings in said insulators through which said bus conductor extends, arc responsive gas-producing means in each of said spaces which are operative to produce a gas when heated by an arc, arcing channels extending through said insulators, and the cross-sectional area of said arcing channels being so related to the volume of said spaces that when a gas is produced by said material in one of said spaces a pressure differential between said one space and an adjacent space is created sufficient to drive an arc through an arcing channel.

References Cited in the file of this patent

UNITED STATES PATENTS

| | | |
|---|---|---|
| 665,888 | Emmet | Jan. 15, 1901 |
| 1,729,713 | Dicke | Oct. 1, 1929 |
| 2,004,527 | Harvey | June 11, 1935 |
| 2,109,090 | Pittman et al. | Jan. 16, 1937 |
| 2,110,672 | Mayr | Mar. 8, 1938 |
| 2,116,676 | Frank et al. | May 10, 1938 |
| 2,230,423 | Bassette et al. | Feb. 4, 1941 |
| 2,306,353 | Cole et al. | Dec. 22, 1942 |
| 2,310,919 | Adam | Feb. 16, 1943 |
| 2,314,292 | Traver | Mar. 16, 1943 |
| 2,532,845 | Jansen | Dec. 5, 1950 |
| 2,653,991 | Dyer et al. | Sept. 29, 1953 |
| 2,675,434 | Herrmann | Apr. 13, 1954 |